No. 854,175. PATENTED MAY 21, 1907.
D. T. OWEN.
COMBINED BED AND COUCH.
APPLICATION FILED AUG. 21, 1905.
2 SHEETS—SHEET 1.
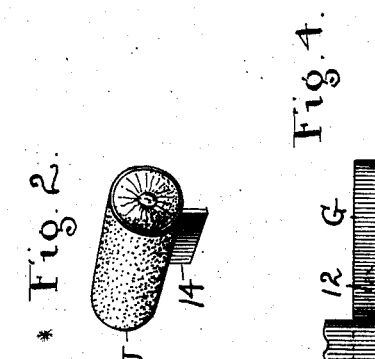
Fig. 1.
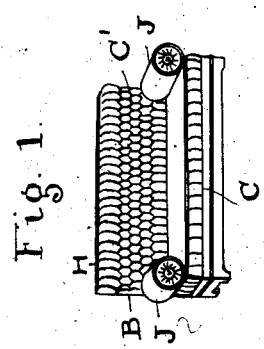
Fig. 2.
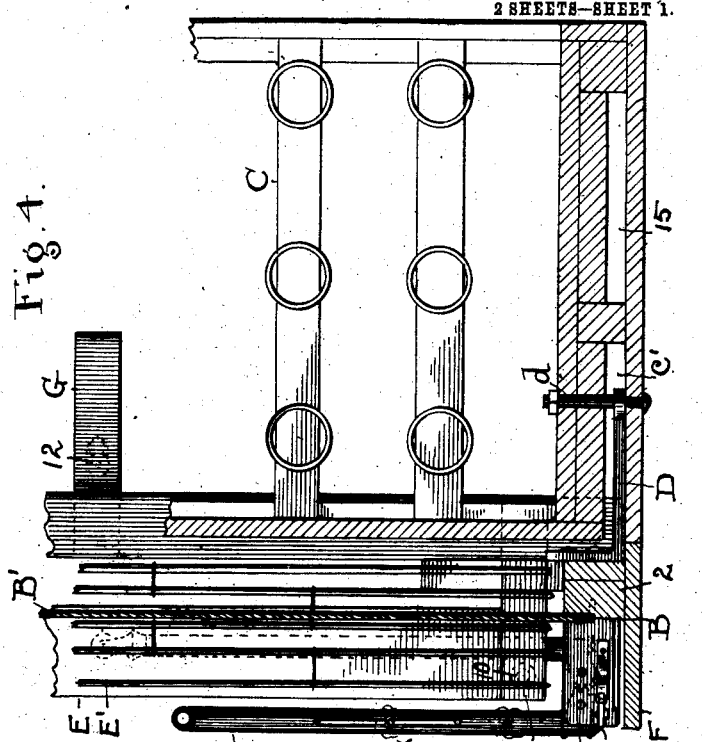
Fig. 4.
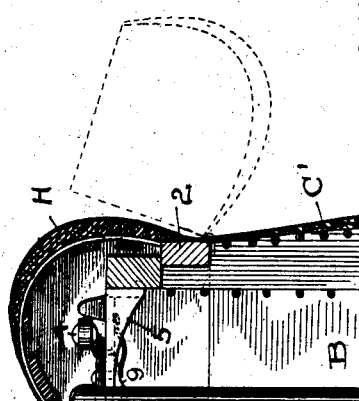
Fig. 3.
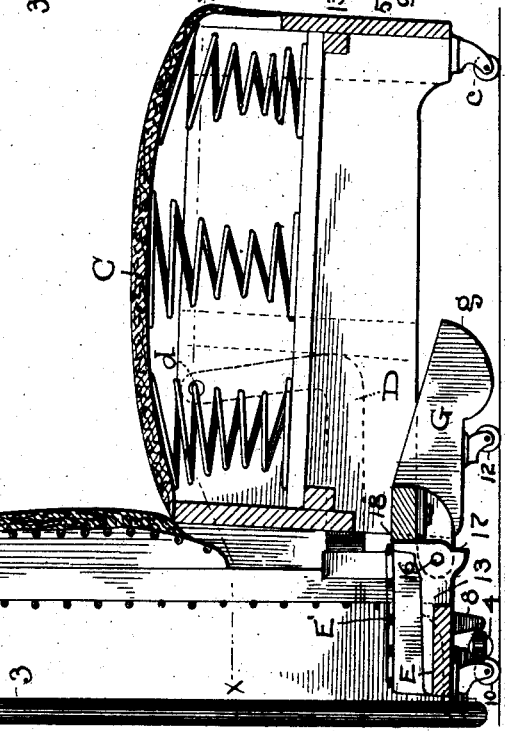
ATTEST.
DAVID T. OWEN – INVENTOR
BY _____ ATTY.

No. 854,175. PATENTED MAY 21, 1907.
D. T. OWEN.
COMBINED BED AND COUCH.
APPLICATION FILED AUG. 21, 1905.
2 SHEETS—SHEET 2.
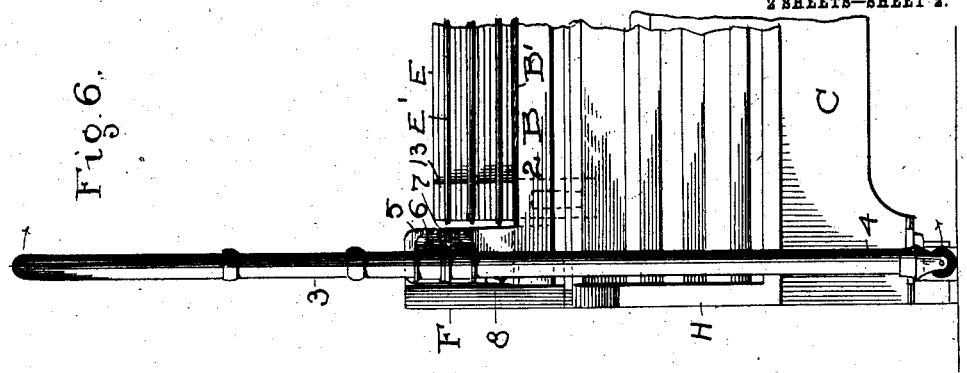
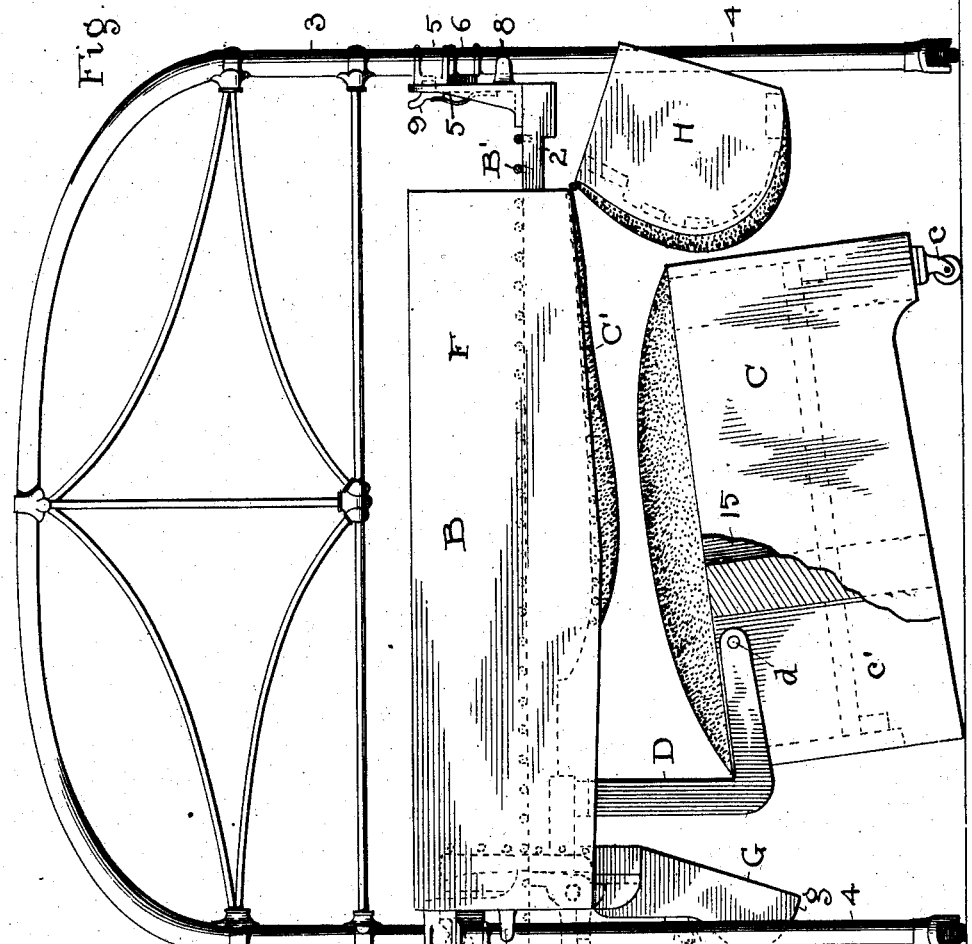
ATTEST
INVENTOR:
DAVID T. OWEN.
BY ATTY.

UNITED STATES PATENT OFFICE.

DAVID T. OWEN, OF CLEVELAND, OHIO, ASSIGNOR TO THE D. T. OWEN COMPANY, OF CLEVELAND, OHIO, A CORPORATION OF OHIO.

COMBINED BED AND COUCH.

No. 854,175.  Specification of Letters Patent.  Patented May 21, 1907.

Application filed August 21, 1905. Serial No. 275,015.

*To all whom it may concern:*

Be it known that I, DAVID T. OWEN, a citizen of the United States, residing at Cleveland, in the county of Cuyahoga and State of Ohio, have invented certain new and useful Improvements in a Combined Bed and Couch; and I do declare that the following is a full, clear, and exact description of the invention, which will enable others skilled in the art to which it appertains to make and use the same.

My invention relates to improvements in combined beds and couches, and the invention consists in the construction and combination of parts substantially as shown and described and particularly pointed out in the claims.

In the accompanying drawings Figure 1 is a front perspective view of my invention as it appears when converted into a couch, and Fig. 2 is a detail of one of the cushioning arms thereof. Fig. 3 is a considerably enlarged view of the parts as converted into a couch but with portions thereof sectioned away as will hereinafter be more fully described. Fig. 4 is a plan view of the invention on a line corresponding to x, x, Fig. 3. Fig. 5 is an end elevation of the invention as it appears when converted into a bed, and in which the couch seat is retired beneath the bed. Fig. 6 is a front elevation of one corner of the bed and other parts seen in Fig. 5.

The combined bed and couch devices thus disclosed is of the usual convertible character found in the line made and patented by me, whereby a bed or a couch can be made at will and simply by turning the bed frame to a horizontal or a vertical position, according as a bed or a couch is wanted. In this instance, however, the invention is found more particularly in the novel mechanism for operatively connecting the bed with the couch as well as for turning the bed from one position to the other and of supporting the bed when down in use, all as will hereinafter more fully appear.

Thus B represents the entire bed, as a whole and C the couch, which are connected by elbows or right angled arms D. The back C' of the couch is built on the bottom of the bed mattress frame 2 as is now common in my line of bed and couch structures, and is provided with its own springs and upholstering as usual. The bed frame comprises said mattress frame 2 and the folding head and foot or end sections 3 and the legs 4. Said end sections and legs are respectively pivoted at their meeting ends on standards 5 on the ends of the mattress frame, and the said leg members are controlled by the end sections 3 head and foot, through geared segments 6 and 7 on said parts, respectively, so that when a bed section is folded down upon the mattress, thus turning it upon its pivots, its segment 6 meshing with segment 7 on the leg will fold the legs inward substantially into alinement with the front and rear edges of the mattress frame. The standards 5 have outward projections 8 beneath the pivot points of the said legs serving as stops to prevent the legs from being turned rearward beyond a vertical position, and the said standard also carries a latch or lock 9 adapted to engage with the end frame 3 in such way as to hold it upright or open when raised, relatively as seen in Figs. 5 and 6.

The couch, or couch seat or frame C is supported at its front upon suitable casters c, but has no support at its rear and bottom, so that the rear edge of the couch rests firmly down upon the floor when the couch is out of use, as in Fig. 5. However, a support for the rear of the couch as well as for the bed in a measure is provided in the substantially right angled arm D as above indicated. Said member is rigidly and firmly attached to the head and bottom of the mattress frame at one of its ends and pivotally engaged at d in a slot c' in the ends of the couch frame at its other end, Fig. 4. The relation of the said elbow or arm D, one at each end of the couch, is such in respect to both the couch and the mattress frame that when the mattress frame has been raised to vertical or folded position it lifts the back of the couch into horizontal position, Fig. 3. This also moves the couch back and forth as may be needed to lower the bed in the first place and then to bring the couch back when the bed is up and a couch is made. Thus, also, the arms D become the sole sustaining means of the rear of the couch and fix its relations to its own back and the bed, but when the parts are down as in Fig. 5 the said arms help to support the bed and would support it if there were no legs 4. However the two mediums of support work harmoniously together and both together are found better than either alone. When the bed is folded it rests on two casters, 10 and 12, respectively, at each end of the bed, and which constitute the floor support of the entire bed structure. Caster 10 is fixed upon the lengthwise end board or rail E at the rear of the mattress frame and supported therefrom on posts 13 and standards 5 come between the ends of this board and the end boards F transversely at the rear of the bed and serving as end supports for the back of the couch. Casters 12 are on the fulcrum legs G of the bed frame, which serve as the initial fulcrum for tilting the bed when the bed is lowered, and are rounded at their front and bottom $g$ to give a rolling bearing at this point. But when the bed is completely lowered and all the parts thereof are in using relation for the purpose of a bed the said fulcrum legs are raised up from the floor relatively as seen in Fig. 5. When the bed is to be again folded or raised up out of the way and the couch restored, the end sections 3 and supporting legs 4 are folded as hereinbefore described, and the bed frame rests upon the crank arms D as its temporary supports and pivots. Then as the front of the bed is lifted the fulcrum legs G come down again to the floor and form a sustaining and turning point for the bed while the rear of couch C goes up, until finally all the parts are restored to position seen in Figs. 1 and 3.

If rear board or rail E were extended to the end boards F and rigidly connected therewith the separate posts or standards 5 at the four corners of the bed intervening these parts might be omitted and the end frames 3 and legs 4 be pivoted directly upon said board or part E. However, for the reasons hereinafter described I prefer the way shown. In this connection I show a hood H running lengthwise at the top of the back of the couch and serving as a cushioned head-rest when up, but hinged so as to drop below the mattress frame and come beneath the bed out of the way and out of sight when the bed is lowered for use. The said hood also serves to conceal otherwise unsightly parts which are thus hidden beneath the same, and its ends sustain such relation to the end legs 4 that it does not interfere with the folding and opening.

It will be noticed as peculiar to the present construction that the rear of the bed has folding legs and that the bed has folding legs and that the bed has no one part on which it has a permanent floor rest whether up or down. And further that the short fulcrum or secondary legs or members G are employed as a medium for rocking the bed to and from supports on angle arms D and the couch frame.

In folding the parts the head and foot frames and the legs are first folded, which leaves the bed to be held by hand in the act of raising to vertical position, or it may be lowered and allowed to rest momentarily upon the couch seat and arms D.

In this particular construction it is desirable to remove the arms of the couch so as to lower the bed to the desired level, and to this end the said arms J are separately upholstered and provided with rigid webs or anchors 14 lengthwise on their bottom and adapted to enter correspondingly shaped slots 15 in the ends of the couch frame, and to seat the said arms firmly but removably therein. Any suitable means for doing this may be employed.

Posts 13 are preferably pivoted at 16 and shoulders 17 and 18 on said posts fix the positions of said posts and end board F to either a vertical or a horizontal position in respect to the spring bottom B'. A spring support E' is stretched between posts 13 and when the bed is lowered for use end board E and spring E' is also lowered to bring it on the same plane as springs B' and thereby increase the width of the bed bottom. In short this arrangement of endboard and supplemental spring extension permits me to make a full four foot six inch bed without unduly changing the proportions of the back of the couch in respect to the seat.

What I claim is:—

1. In a combined bed and couch, a bed frame and a couch seat hinged thereto and adapted to support said bed frame during folding and unfolding operations, in combination with foldable legs at each corner of said bed frame adapted to provide supplementary supports for the front and rear of said bed frame when down.

2. In a combined bed and couch, a bed-frame and a couch-frame, angular arms supporting the rear of the bed-frame from the couch-frame and folding legs at the rear of said bed-frame.

3. In a combined bed and couch, a bed-frame having folding legs at its rear and fulcrum members rigidly fixed to the rear of said frame and shorter than said folding legs.

4. In a combined bed and a couch, a bed-frame having folding supporting legs and rigidly fixed fulcrum members at its rear, in combination with a couch frame and angle arms engaging the rear of the bed frame with the rear of the couch frame.

5. In a combined bed and couch, a bed-frame having rear folding legs and shorter fixed fulcrum legs, in combination with a couch frame constructed to rest upon the floor at its rear and angle arms operatively connecting the bed-frame therewith.

6. The combination of the bed-frame and the couch-frame, and angle arms connecting said parts, said couch frame constructed to rest directly upon the floor at its rear, and fulcrum legs fixed upon the main frame behind said elbow arms and having a bearing surface on their bottom and rear portions, whereby the bed frame is socketed into vertical position from said angle supports and said fulcrum legs successively.

7. The couch-frame having open spaces at its ends and rear, the bed-frame having folding legs at its front and angle arms rigid upon the bed-frame and pivotally engaged in said open spaces with the couch frame, whereby the rear of the bed is supported from the couch.

8. In a combined bed and couch, a bed-frame having front and rear folding legs and fixed rear fulcrum members shorter than said legs, in combination with a couch frame adapted to rest upon the floor at its rear and angle arms supporting the bed-frame from said couch frame, said fulcrum members having rocking bearings and arranged behind said angle arms.

9. In a combined bed and couch, a mattress frame in said bed, head and foot frames adapted to fold upon the bed and legs operatively engaged with said frames and adapted to be folded thereby, in combination with a couch frame adapted to rest upon the floor, arms supporting the bed-frame from the couch frame and fulcrum members on said bed-frame and adapted to support the same in a rocking position after the said folding legs and supporting arms have performed their office in the conversion of the bed.

10. In a combined bed and couch, a bed-frame having rigid rear fulcrum legs at substantially right angles to the plane of the bed bottom and provided with a floor engaging surface on their rear and under sides, in combination with a couch frame constructed at its rear to rest directly upon the floor, and rigid substantially right angled arms fixed to the bed-frame and pivotally engaged in the ends of the couch frame.

11. In a combined bed and couch, a bed-frame having folding legs and rigid rear fulcrum members shorter than said legs and provided with rounded extremities, in combination with a couch frame and supports for the bed pivotally engaged with the rear of said frame.

12. In a combined bed and couch, a bed frame and a couch frame hinged thereto between the front and rear sides thereof, and foldable legs both front and rear upon said bed frame whereby said bed frame is supported at all corners when unfolded.

13. In a combined bed and couch, a bed frame having a fulcrum member adapted to initially lower said bed frame from a vertical position, a couch seat pivotally connected with said bed frame and adapted to provide a secondary support in the lowering operation, and separate foldable legs front and rear upon said bed frame adapted to support the same horizontally above said couch seat.

14. A bed frame having fulcrum legs at one side adapted to initially lower the bed, and separate foldable legs at each corner of the bed frame adapted to support the same when lowered, and a hood hinged at the front side of said bed, in combination with a couch seat pivotally supported upon the bottom of said bed frame and adapted to provide a central support therefor when unfolded.

In testimony whereof I sign this specification in the presence of two witnesses.

DAVID T. OWEN.

Witnesses:
R. B. MOSER,
C. A. SELL.